Feb. 14, 1939. H. BUSCH Re. 21,002

PNEUMATIC DISPATCH TUBE CARRIER

Original Filed Dec. 28, 1934.

Herman Busch INVENTOR.

BY Wm. F. Purcell his ATTORNEY.

Reissued Feb. 14, 1939

Re. 21,002

UNITED STATES PATENT OFFICE 21,002

PNEUMATIC DISPATCH TUBE CARRIER

Herman Busch, Long Island City, N. Y., assignor to Airmatic Systems, Inc., New York, N. Y., a corporation of New York Original No. 2,023,218, dated December 3, 1935, Serial No. 759,479, December 28, 1934. Application for reissue October 29, 1936, Serial No. 108,314

2 Claims. (Cl. 243—35)

This invention relates to pneumatic dispatch tube carriers and particularly to the type of carriers in which one end is adapted to be opened or closed for the removal or enclosure of papers or other contents.

A carrier of this general type is shown and described in a patent issued to J. T. Needham, March 28, 1916, No. 1,176,918.

It is been found in practice, that it is frequently necessary to remove the working parts of the enclosure mechanism of this type of carrier for the purpose of cleaning, adjustment, repair, or renewal.

One object of the present invention is to improve the construction of carriers, having this type of closure, so as to make the working parts more accessible for cleaning and repairing.

Another object is to provide a means of lubrication for the said parts which will prevent the lubricant from soiling the papers or other contents of the carrier.

Another object is to provide improved means for holding the working parts in position and for housing the same in the carrier.

Another object is to provide an improved arrangement for taking up the shock of the working parts incidental to the use.

A further object is to provide a form of closure grid which is relatively rigid and capable of withstanding shocks by a substantially direct transmissal of the shock forces to a firm portion of the housing.

In the accompanying drawing:—

Figure 1:
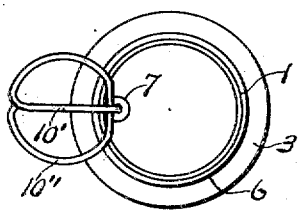
Fig. 1 is a plan view showing the carrier open for insertion or removal of contents.
Figure 3:
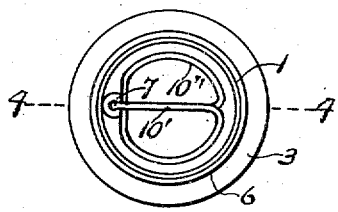
Fig. 3 is a plan view showing the carrier closed.

Referring to the parts by reference numerals, 1 designates a cylindrical member closed at one end by a cup shaped member 2 which is riveted or otherwise attached thereto. A cylindrical block 3, of felt or other suitable material, is secured to the cup shaped member so as to provide a buffer or piston head for the carrier and a band or collar 6 is secured around the open end of the member 1 to reenforce the latter at that point. The numeral 7 indicates a tubular member closed at one end by a plug 8 and provided at the other end with a removable screw-plug 9. Through this plug is slidably movable a rod 10 which is provided at one end with a removable head 11 and is surrounded by a compression spring 12. The head 11 is shown threaded onto the rod. The action of the spring against the head 11 is to retract the stem or rod 10 into the housing provided by the tubular member 7. The inward movement is limited by the plug 8 which is preferably rigidly secured in place. In this manner the plug 8 can readily withstand the stocks of head 11 thereagainst occurring when the carrier is in use.

The upper end of the spring bears against a collar 13 which loosely encircles the rod and is cupped on one side so as to act as a stuffing box gland, the screw-plug 9 is similarly cupped and serves as the other gland so that when packing is placed between the two parts at 14 the pressure of the spring urges the rod 10 inwardly and also, by its pressure against the collar 13, causes the packing to prevent leakage around the rod 10. The movable parts of the closure mechanism are thus protected from dust and dampness and oil may be placed in the tubular member to keep said parts lubricated and free from rust.

The outer end of the rod 10 is shown as being coiled to form a handle 10′ and a flat spiral or grid 10″, adapted when in proper position, to hold papers within the carrier. The tubular member 7 is attached to the inside of the member 1, preferably by rivets through the holes 15, and in such position that when the rod 10 is drawn inward by the spring the handle 10′ will be entirely within the open end of the carrier.

Figure 2:
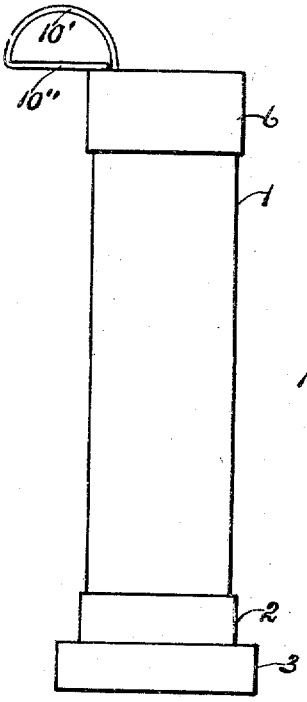
Fig. 2 is a side elevation of the same.
Figure 5:
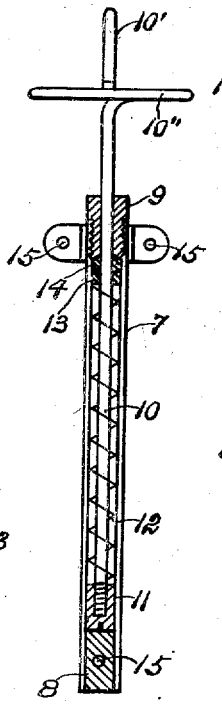
Fig. 5 is an enlarged longitudinal sectional view of the closure mechanism taken on the line 5—5 of Fig. 4.
Figure 4:
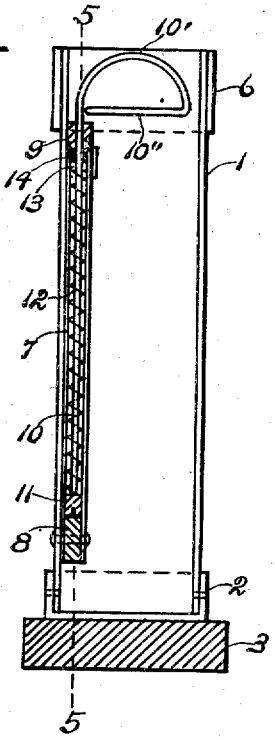
Fig. 4 is a longitudinal sectional view taken on the line 4—4 of Fig. 3.

When it is desired to place papers in the carrier or to remove them therefrom, the rod 10 is pulled outwardly, against the tension of the spring 12, by means of the handle 10′ and turned so that the flat grid 10″ is in the position shown in Figs. 1 and 2 of the drawing thereby permitting free access to the interior of the carrier.

After the papers or other material are inserted into the carrier, they are enclosed by rotating the grid about its stem until the grid enters the open end of the carrier, whereupon the retracting spring 12 snaps the grid and stem downwardly until the head 11 engages plug 8 and stops the closure grid in rest position.

I claim:

1. A pneumatic tube carrier including a cylindrical body member having a closed and an open end, a tubular member within said body member and attached longitudinally to the inner wall thereof, said tubular member being closed at one end and having a removable plug at the other, a rod adapted to extend from said tubular member and slide through a hole in the plug, said rod being formed at the outer end so as to be capable of confining contents within the body member of the carrier and having a head at the inner end adapted to slide within the tubular member, a collar encircling the rod, a compression spring interposed between said collar and the head on the rod and packing interposed between the collar and plug.

2. In a closure assembly for a pneumatic carrier having an open end, said assembly embodying a closure member comprising a rod having one end formed as a closure for said open end of the carrier and the other end as a stem extending inwardly longitudinally of the carrier, a longitudinally extending housing secured to the inner wall of the carrier having an open end for receiving said stem, a retaining sleeve about the intermediate portion of said stem deachably secured to the open end of the housing, an abutment on said stem below said sleeve, retracting means disposed between the abutment and the sleeve, and a stop member independent of the sleeve incorporated in said housing against which said stem and closure are brought to rest, whereby said sleeve is relieved of any stopping function.

HERMAN BUSCH.